Aug. 8, 1961 M. P. CHAPLIN 2,995,188
PULP MOLDING MACHINE

Filed Jan. 28, 1957 10 Sheets-Sheet 3

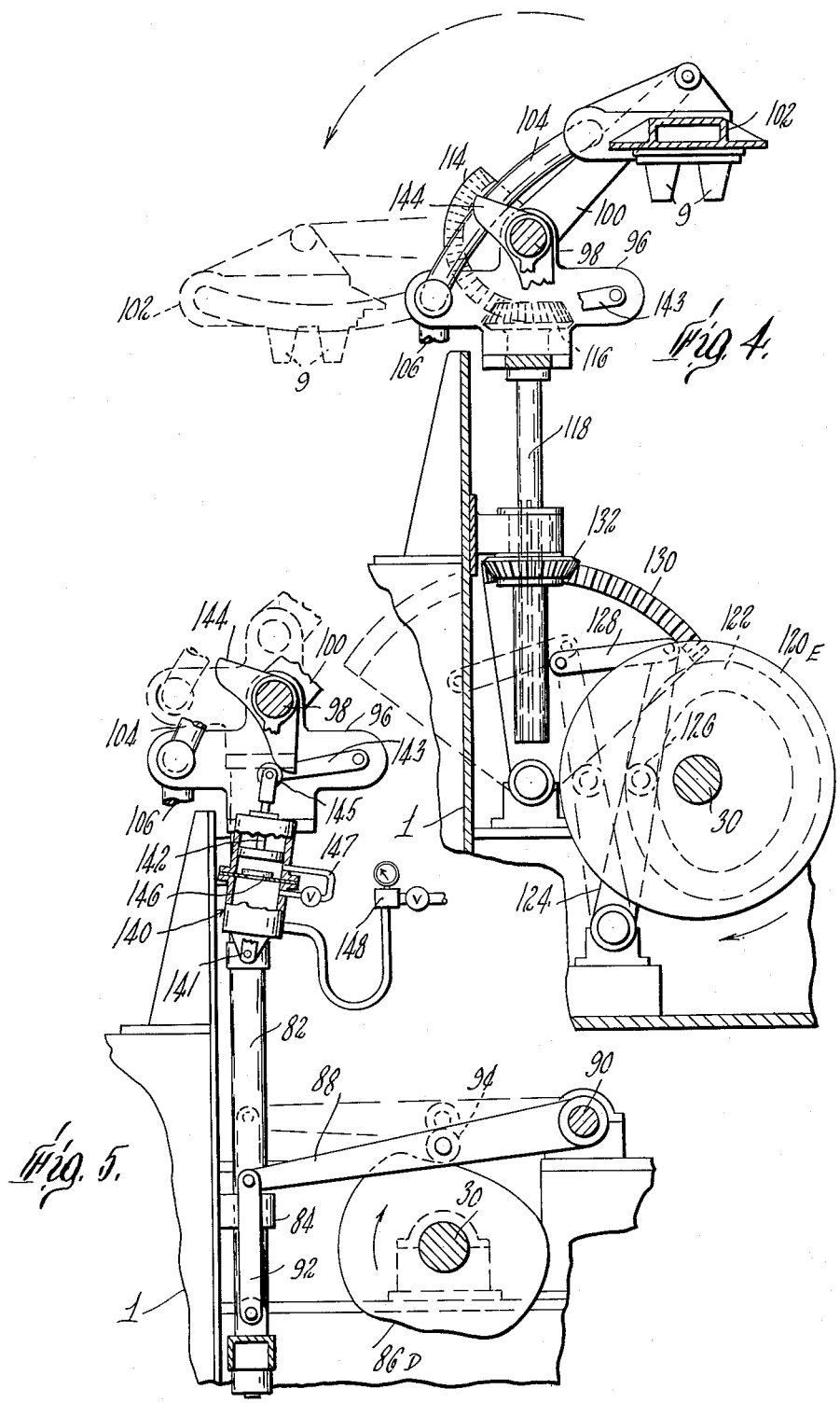

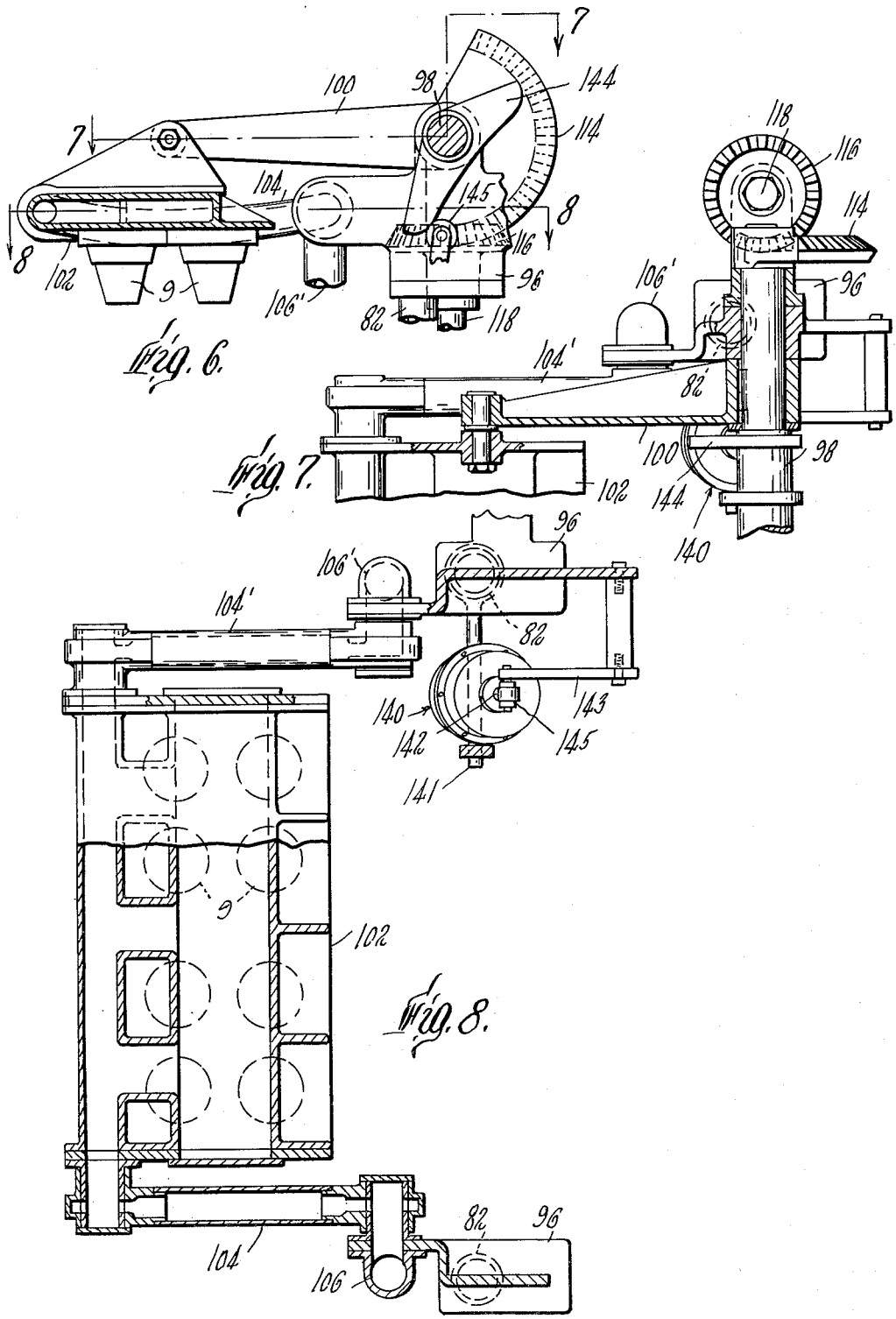

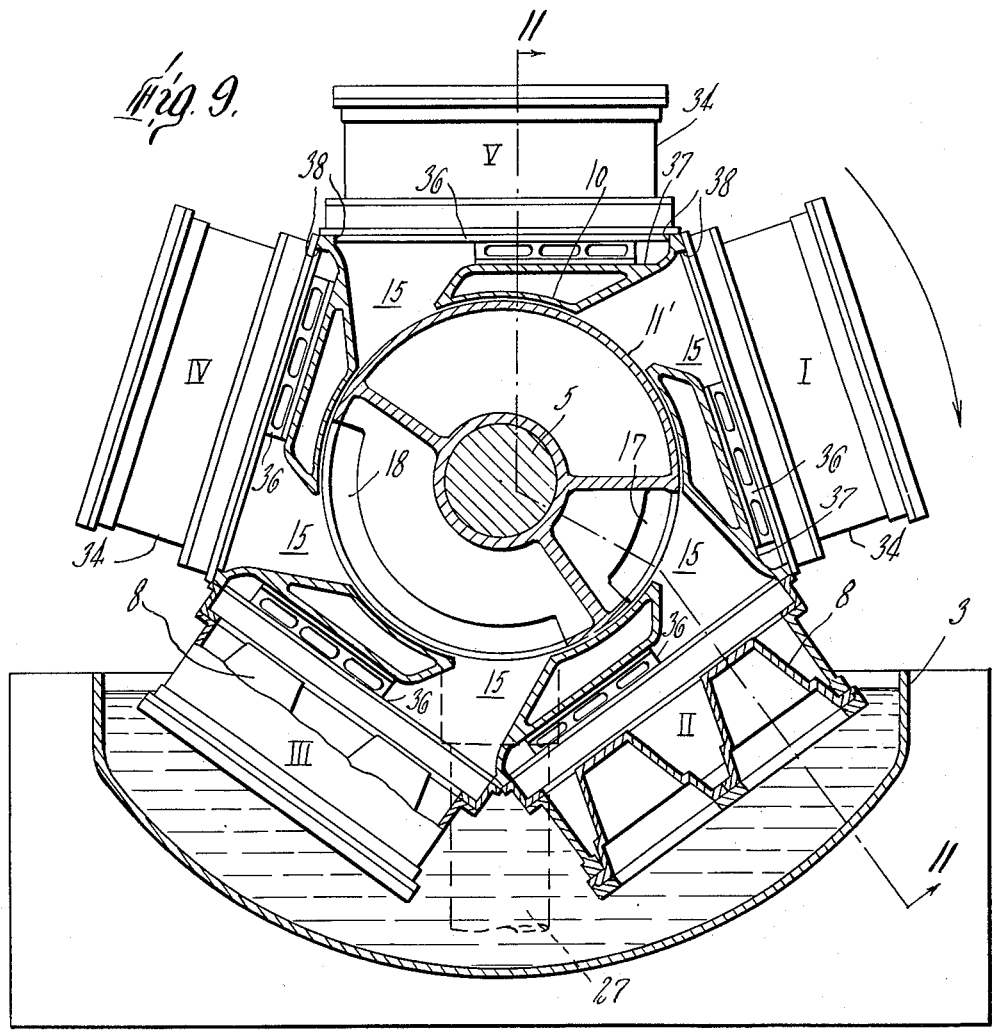
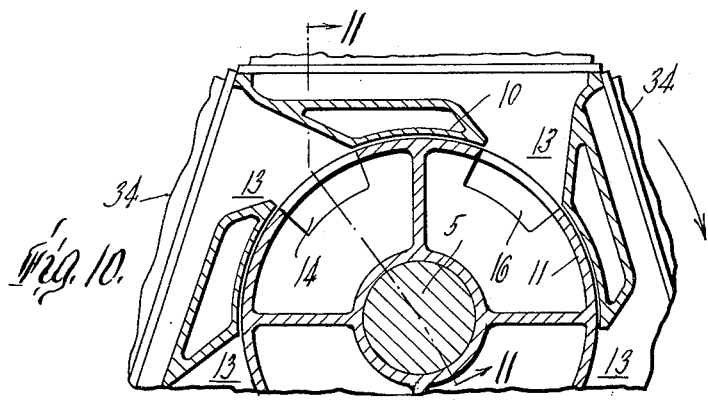

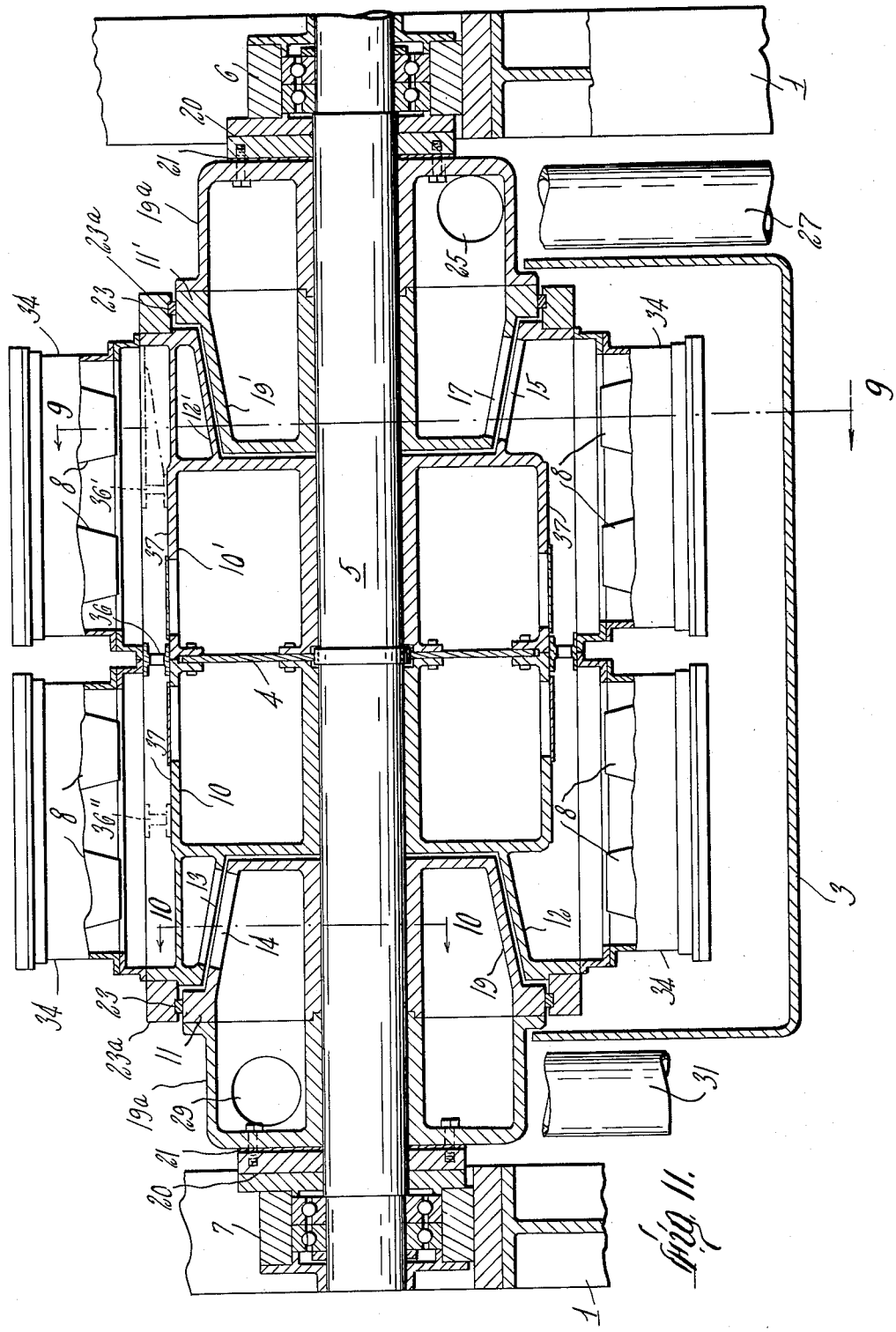

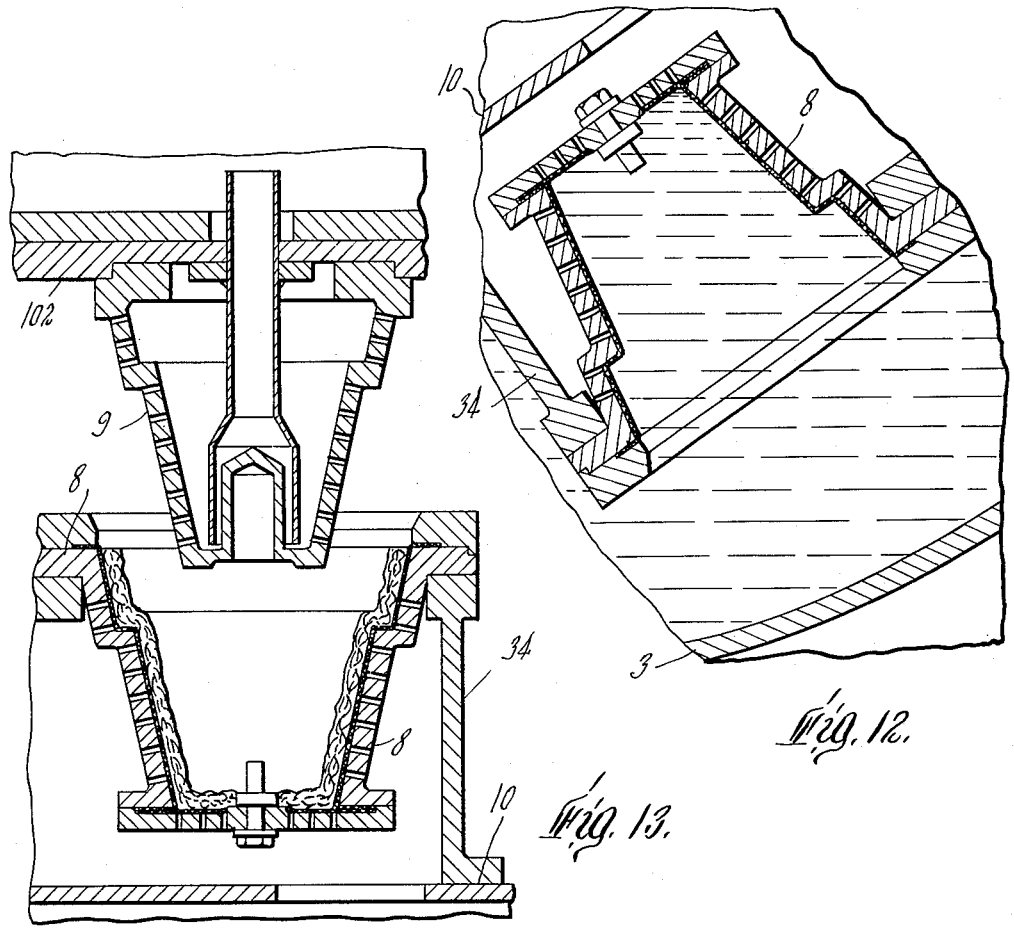
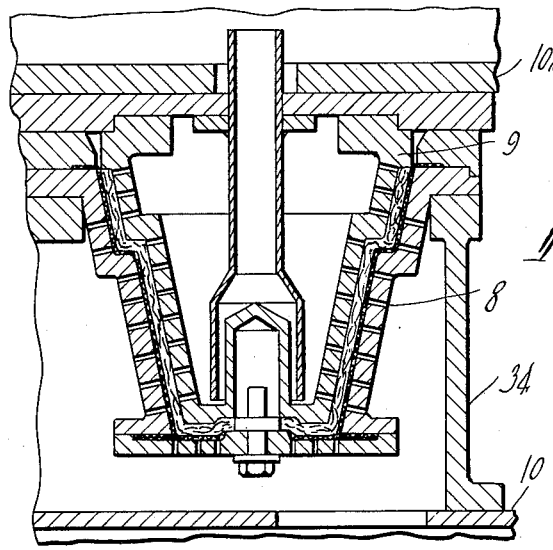

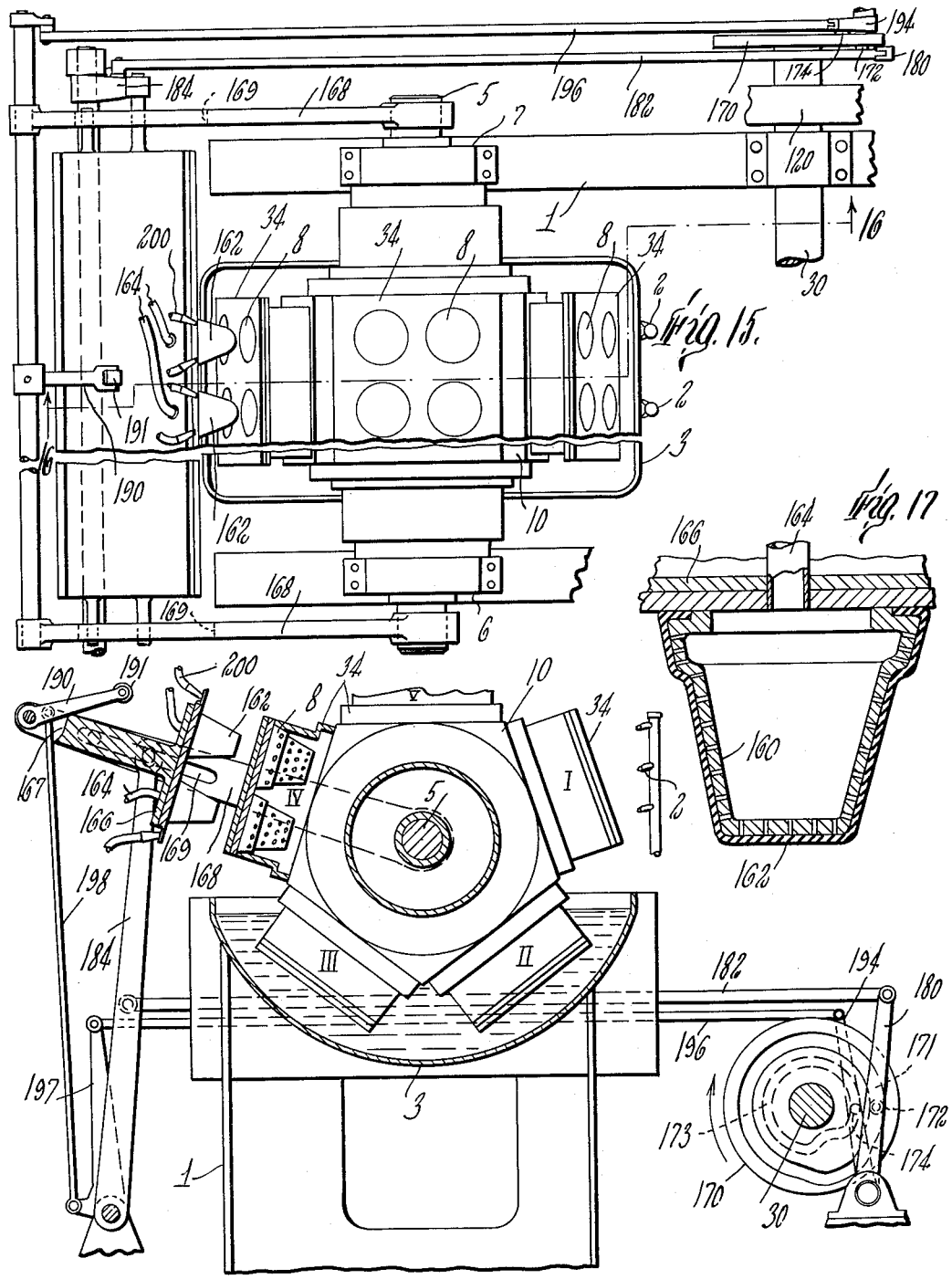

United States Patent Office 2,995,188
Patented Aug. 8, 1961

2,995,188
PULP MOLDING MACHINE
Merle P. Chaplin, South Portland, Maine, assignor, by mesne assignments, to Diamond National Corporation, New York, N.Y., a corporation of Delaware
Filed Jan. 28, 1957, Ser. No. 636,804
18 Claims. (Cl. 162—392)

This invention relates to apparatus useful in the manufacture of molded articles from liquid fibre mixtures. It represents an improved type of machine over that disclosed in my Patent 2,307,022, dated January 5, 1943, and is a continuation-in-part of my earlier copending application Serial No. 514,317, filed June 9, 1955, and now abandoned.

In my said prior patent I utilized a combination of mechanical and hydraulically controlled motions for performing the various machine functions. One objection to this type of machine is that the hydraulic functions do not necessarily operate at uniform times, but are dependent on fluid pressure, resistance to motion, and a number of other factors, making it difficult accurately to correlate mechanical and hydraulic motions. The usual result is to slow up the operation of the entire machine to an extent that all hydraulic motions are given more time than ordinarily necessary in order to catch up with mechanical motions and their time relation therewith. This frequently results in inefficient operation.

One primary objective of this invention is to provide a completely mechanically operated device whereby the motion of all machine parts, dies, etc., can be accurately controlled and regulated, including the application of air and vacuum for the proper operation of the machine and the transfer of articles therethrough. Where hydraulic mechanisms are used to separate dies, it is difficult to time the air sufficiently accurately so the air will be applied at the exact separation moment of the two dies, otherwise, either an excess amount of air must be used, or the article will fail to transfer.

Another objective of this invention is to provide a mechanism whereby coacting dies are moved in exact alignment with each other for their entire depth, thereby enabling the forming and transfer of articles having a minimum of taper or even articles having perfectly straight sides.

Another objective of this invention is to provide a mechanism whereby the freshly molded articles can be uniformly pressed over their entire surface and at right angles to the article surface regardless of the article shape.

Another objective of this invention is to provide a forming mechanism whereby the moving and stationary members which control or direct the movement of air, vacuum, liquid mixtures, etc., to the various die positions from the stationary control valves and piping, are maintained out of contact with each other, thereby enabling the machine to operate when using fillers or other abrasive materials or ingredients which are detrimental to contacting valve surfaces which are moved while in friction contact with each other.

Another objective of this invention is to deliver the freshly formed articles to a dryer-conveyor mechanism, depositing the articles gently on this dryer-conveyor mechanism with a minimum of tendency to distort or injure the article during such delivery.

Another objective of this invention is to provide a forming mechanism whereby all die positions are usefully employed, and whereby the number of positions utilized for forming the article from the liquid pulp mixture can be increased or decreased in different types or sizes of machines to make them more suitable for producing certain types of articles and employing certain kinds of fibrous and/or other materials.

Another objective of this invention is to provide means whereby the water extracted by any die can be readily removed from the lower-most die position, either by admission of atmospheric air in the case of the forming unit, to replace the water of formation allowing it to drain away, or provision of special drainage means in depending dies used to transfer the article from the forming dies to the dryer.

Another objective of this invention is to provide pneumatic or hydraulic mechanism which will act to assist in the retarding or accelerating the movement of certain mechanical parts of the machine while such parts are under complete mechanical control as to timing and position.

Another objective of this invention is to provide a forming die carrier, the active size of which can be varied to meet different die conditions and sizes, and to facilitate rapid exchange of the die mountings.

The foregoing and other novel and desirable objects and features of my novel apparatus are more fully explained in the following detailed description of a preferred embodiment thereof, when taken in conjunction with the accompanying drawings wherein:

FIGS. 4, 5 and 6 are partial side elevations of the apparatus of FIGS. 1-3 showing the details of the transfer die mechanism of my invention;

Figure 1:
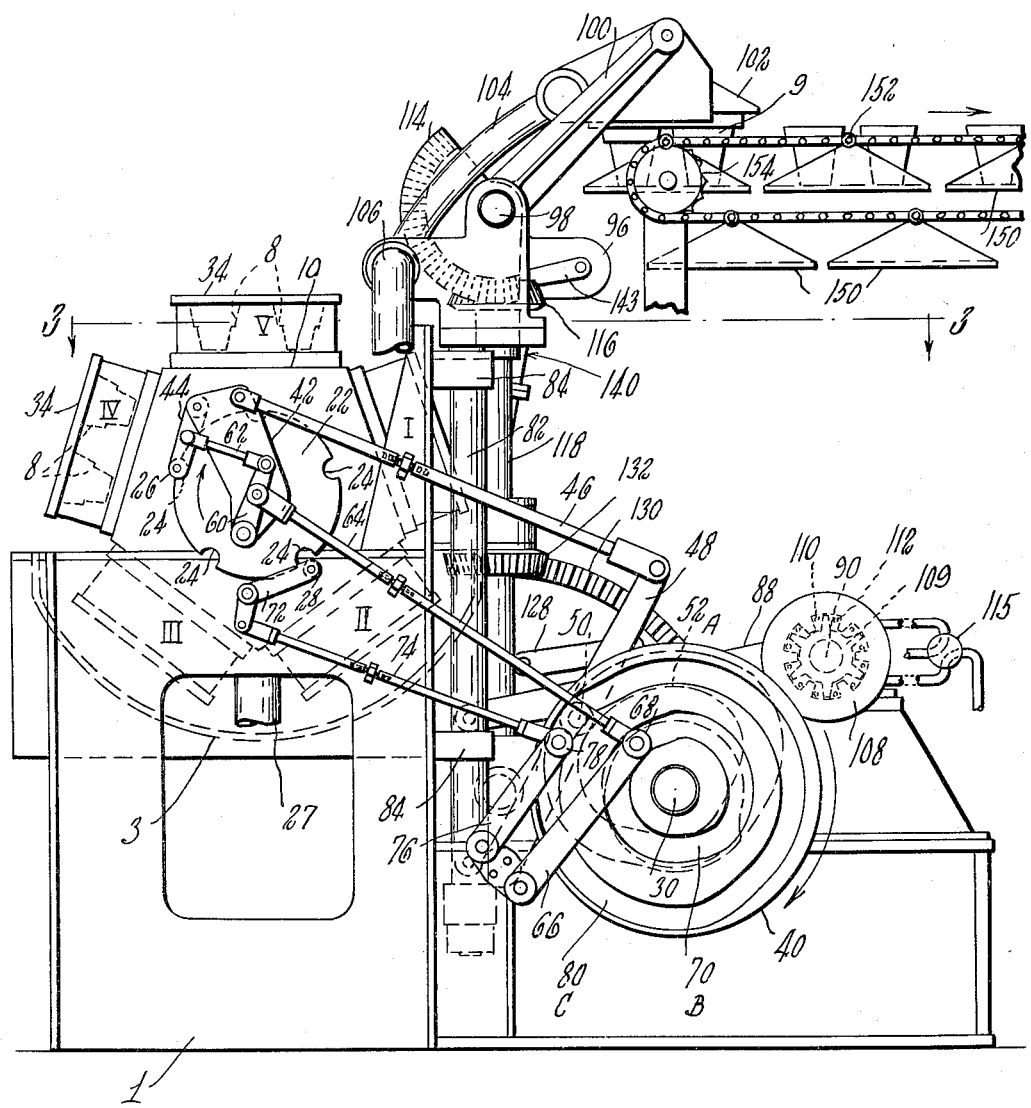
FIG. 1 is an overall side elevation of the preferred apparatus of my invention.
Figure 2:
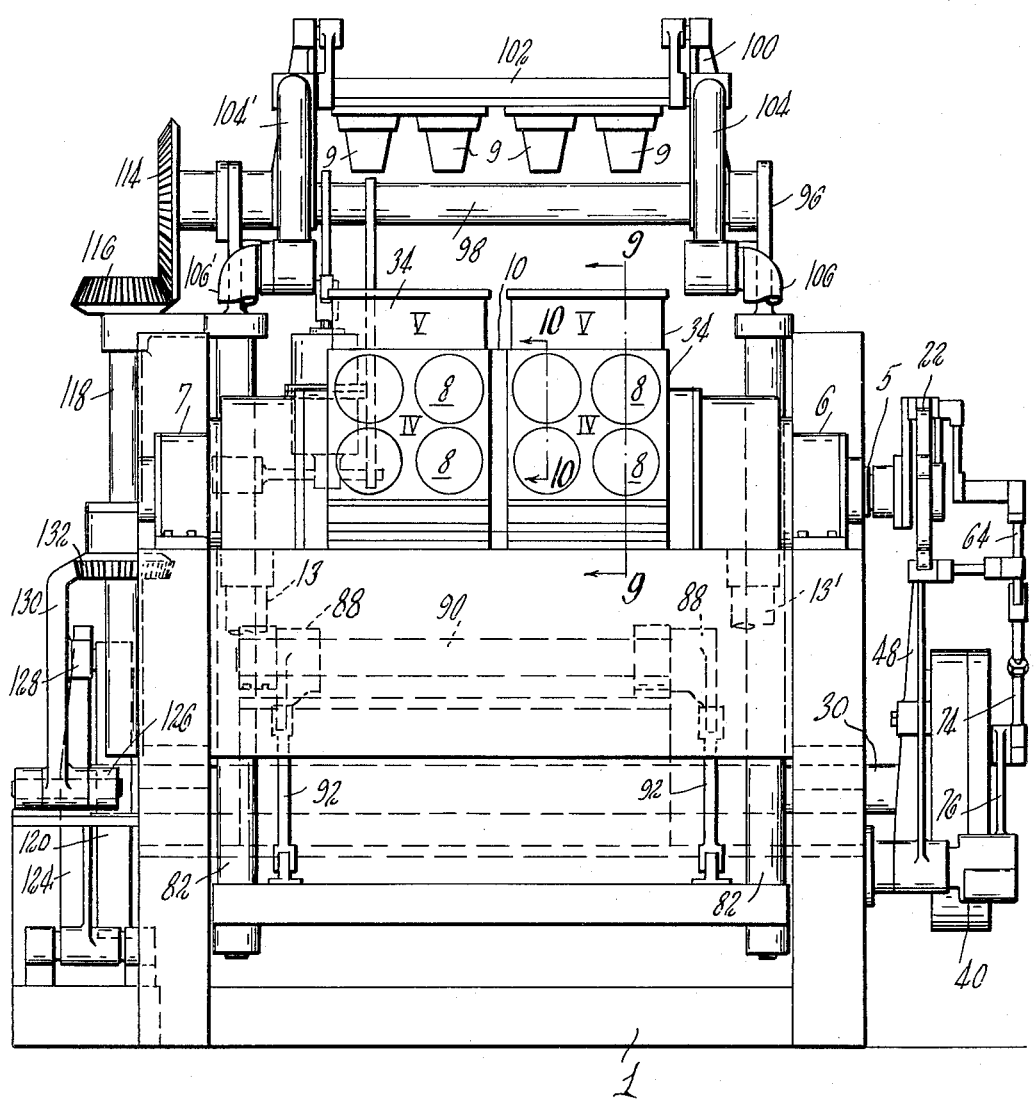
FIG. 2 is a general front elevation of the apparatus of FIG. 1.
Figure 3:
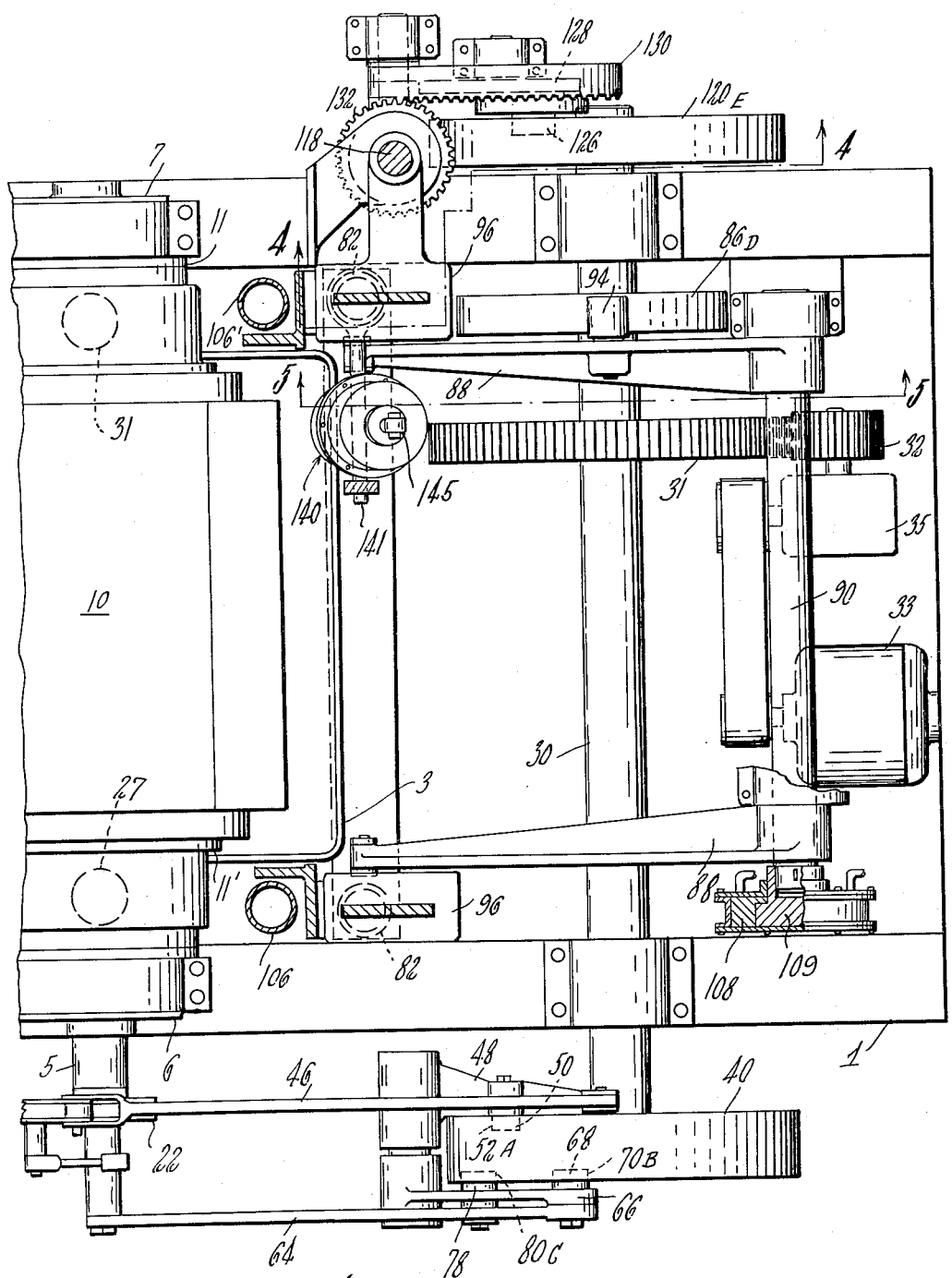
FIG. 3 is a general plan view of the apparatus of FIGS. 1 and 2.
Figure 18:
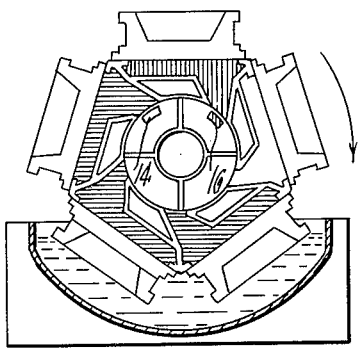
Figure 19:
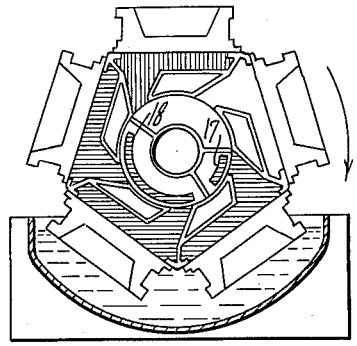
Figure 20:
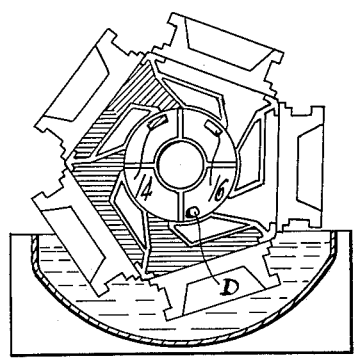
Figure 21:
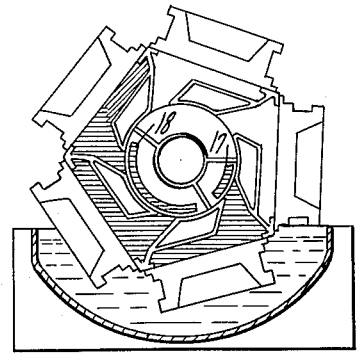
Figure 22:
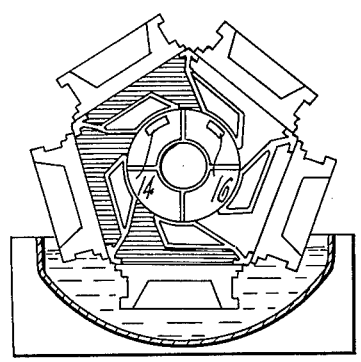
Figure 23:
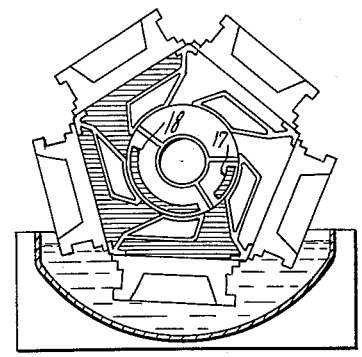
Figure 24:
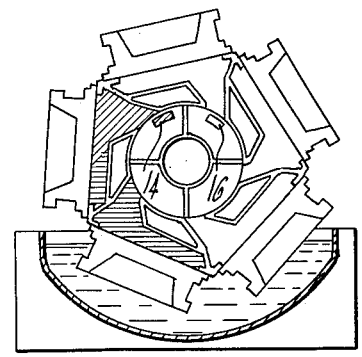
Figure 25:
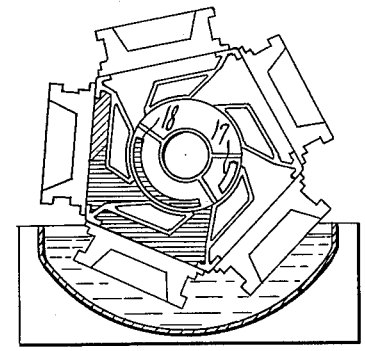

FIGS. 7 and 8 are partial sectional plan views of the portion of the apparatus of FIGS. 4, 5 and 6 taken on lines 7—7 and 8—8 of FIG. 6;

FIGS. 9 and 10 are sectional end elevations of the forming die carrier drum and tank portion of the apparatus of FIGS. 1-3;

FIG. 11 is a sectional front elevation of the mechanism of FIGS. 9 and 10;

FIG. 12 is an enlarged sectional view of a forming die immersed at a forming position;

FIGS. 13 and 14 are enlarged sectional views of a forming die and a transfer die respectively disengaged at one extreme of the straight line travel of the latter and engaged with one another to effect the transfer of an article from the forming die to the transfer die;

FIG. 15 is a plan view of the apparatus of FIG. 1 showing certain elements of the pressing mechanism;

FIG. 16 is a side elevation of the apparatus of FIG. 1 showing the novel pressing means of the invention;

FIG. 17 is an enlarged view showing the pressing die of FIG. 16; and

FIGS. 18 through 25 are diagrammatic views showing the operation of the forming dies throughout a machine cycle as vacuum air, atmospheric air and pressure air are applied thereto, vacuum being indicated by horizontal section lines, pressure by vertical section lines and atmospheric air by diagonal section lines.

In order to produce strong durable molded fiber articles through suction molding procedures, it is necessary to start with a dilute mixture of water and fibers, usually of the order of about 0.5% fiber, while the finished molded fiber article has about a fiber content of 90% or above when it is in its best condition for use. Thus, the production of superior types of articles necessary for the packaging of widely different kinds and types of products or merchandise, requires the removal of large quantities of water during its manufacture. For the necessary efficiency in operation, this must be done rapidly, yet under conditions which do not detract from the utility and appearance of the finished article. Furthermore, the widely different uses of the molded articles produced by the apparatus of this invention require that it be extremely flexible, both from the standpoint of quick and easy die changes and from the standpoint of methods of production, and that each phase be completely integrated with associated phases.

Thus, the integrated operation of my novel apparatus is in general as follows: Liquid-fiber mixture is introduced into a tank under constant circulation and agitation so that there will be a uniform dispersion or mixture of fibers and liquid at all times. A suction forming die on which the article is to be formed is caused to be intermittently advanced to position it first at a forming station or stations in this mixture while vacuum or suction is applied to the die surface to draw the liquid through the wire screen or other foraminous surface, leaving on the surface of the screen a deposit of fibers still containing a considerable amount of water. Also, it is preferred that a plurality of forming stations, two being here shown, be provided to speed up the production of articles by enabling the formation process to take place during a greater proportion of the rotation cycle of the forming drum.

After emergence from the liquid-fiber mixture in the tank, suction may be continued through the forming die at one or more stations to draw the fiber mixture tightly against the die surface to compact and solidify the fibrous mat. Thereafter, the freshly formed article is sufficiently durable so that it may be moved to a discharge station at which point it may be removed by a transfer die accurately fitting the article surface.

Preferably, however, before removing the article from the forming die, it is compressed by an expandable pressing device which acts at right angles to the article surface regardless of article shape. This pressing means acts on the article immediately after the article on the forming die has been removed from the liquid-fiber mixture, and which usually still contains enough liquid so that the expressing of this liquid from the article by pressure effects an integralizing or interlacing of the fibers making up the entire body of the article, increasing its strength and serviceability as well as smoothing the article surface. If necessary or desirable, water or other liquid can be sprayed on the surface of the article just prior to the compressing operation to further aid in the solidifying or integralizing of the article structure by the pressing operation. Any liquid or other material expressed from the article by pressing is removed through the forming die by the regular suction means.

Thereafter, the transfer die moves it to an output station, usually closely adjacent to a conveyor which carries it to and through a dryer. It is important that, particularly with deep articles, the transfer die initially move in a straight line, preferably vertically, from a vertically disposed discharge station to avoid damage to the freshly formed article, and it is also desirable that the movement of the transfer die, when depositing the article on the conveyor, be both properly decelerated and moved in a straight line to avoid damage to the article by depositing it gently on the conveyor surface. Too, it is helpful to maintain the article in a vertical position during its entire transfer motion to avoid side forces which might damage it or alter its appearance.

The conveyor which receives the article from the transfer die should be closely adjacent the transfer die while it is receiving an article, and should have a surface which will not mar or injure the article but will preserve the form of the portion of the article in contact with it. This is especially important when, as is usual, the article is dried and possibly conditioned while still remaining on the conveyor.

If desirable or necessary, forms or guides can be placed on the dryer mechanism to effect a support of an article where any surface or portion of the article might sag or warp during the drying operation. The dryer mechanism is preferably provided with insert plugs or openings into which forms or other structures can be readily inserted when specially shaped objects are to be manufactured.

Referring now to the drawings, in FIGS. 1–3 is shown mounted on a suitable base frame 1 for rotation about a generally horizontal axis above the liquid-fiber mixture in tank 3 a shaft 5 with suitable bearings 6 and 7 which not only provide for the rotation of shaft 5 but also hold it in fixed position relative to frame 1. Shaft 5 has mounted thereon for rotation therewith a forming drum which, as best shown in FIGS. 9–11, is made up of two sections 10 and 10' mounted on said shaft for rotation therewith and about the periphery of which are mounted a plurality of forming dies 8 on die carriers 34.

It will be observed that the die carriers 34 are mounted on the five-sided rotating drum sections 10 and 10' and each opening in the five-sided drum sections provides a generally rectangular opening as shown in section, lengthwise in FIG. 11 and in cross section in FIG. 9. As is shown in FIG. 11, two die carriers 34 are shown mounted on said drums, and to provide for sealing the opening between these two carriers, there is provided an adjustable and movable cross member or spacer 36 as indicated in FIG. 11. There is also indicated in FIG. 11 in dotted lines, two other spacing structures 36'—36" shown to illustrate their possible uses for other die carrier mountings than that shown on FIG. 11. One said spacer 36', effecting a cover over a substantial section of the hub opening, and the other said spacer 36", showing that there might be used more than two die carrier mountings by having spacers properly located.

As is shown in FIGS. 9 and 11, a finished surface is provided at 37 on said drums on which these spacers are mounted, and as shown in FIG. 9, the inside edges of the drum are finished at 38 so that when the spacer is in place at any position longitudinally of the opening, it will close the opening for the entire width of the carrier by abutting against the finished surface 38 on the drum and being flush with the outside surface of the drum, or the surface on which the die carriers are mounted. It will thus be seen that I have provided a readily adjustable means for changing the size of the rectangular opening in each of the five surfaces of the drum member so that die carriers with dies of various sizes, combinations and arrangements can be readily mounted and quickly interchanged.

For mounting said sections 10 and 10' on said shaft, a radially extending disk 4. having a central aperture of a diameter sufficient to receive said shaft 5, is welded or otherwise attached thereto generally centrally thereof, and the adjacent inner ends of drum sections 10 and 10' are bolted thereto by suitable through bolts. The outer ends of each of said drums are provided on the distal ends thereof with conical portions 12 and 12' having ports 13 and 15 mating at the position shown in FIG. 11 with the ports 14 and 16 respectively of conical portions 19 and 19'.

The conical portions 19 and 19' are fixed closely adjacent to, but out of contact with the rotating members carrying the ports 13 and 17, the conical members 19 and 19' being held in fixed position by a spacing and pipe connecting member or members 19a and 19a', which are secured directly to plates 20 on the bearings 6 and 7 which support the forming shaft and unit. The position of the conical members 19 and 19' are adjusted endwise into proper spacing relation between these members and the conical portions 12 and 12' of the central members by means of a shim 21, which shim is made of the proper thickness to secure and fix permanently the spacing between the rotating forming unit and the stationary conical valve at a limited but fixed distance so that there is no rubbing contact between their two surfaces which would cause them to wear or score, such spacing being shown in exaggerated form in FIGS. 9 through 11.

The stationary conical members 19 and 19' are sealed against external leakage between the rotating member by means of a seal 23 affixed to the rotating ring 23a.

It is, of course, understood that there are ports 13 and 15 for each of the five or more positions of the forming unit, these registering with suitably located ports 14, 16, 17 and 18 in the stationary conical member for supplying air, atmospheric air and vacuum to the several dies as is more completely illustrated in FIGS. 18 to 25 inclusive.

Suitable pipe connections 25, 27, 29 and 31 are provided to the several port openings in the conical valve members for furnishing air, vacuum and atmospheric air or water extraction to the forming unit at properly pre-arranged times and cycles.

The forming dies 8 are constructed in any suitable manner known to the art for the formation of molded pulp articles of various kinds and types. Although any suitable number or sets of these dies may be employed, according to the present invention it is preferred that five sets of dies be arranged around the drum periphery on the uniformly-spaced supports to provide five die positions or stations, herein designated as I, II, III, IV and V as shown on FIGS. 1 and 9. In the interest of simplified description, these sets of forming dies will hereinafter be referred to as a single "die" which shall be understood to designate any desired number in each set, and the same terminology will be followed with respect to the transfer dies 9 hereinafter described which subsequently coact with the articles. Rotation of the drum 10 carrying these dies 8 causes them to pass into and through the water-fiber mixture in tank 3 and a fibrous layer is accreted on each forming die so submerged at forming stations II and III by virtue of the air suction applied thereto to form an article thereon. Thereafter, the dies are advanced to an intermediate station IV for pressing and further water removal and finally to a discharge station V positioned generally vertically at the top of drum 10. Before again being immersed in the water-fiber mixture, the dies 8 are washed by spray nozzles 2 at station I.

Referring again to FIGS. 9–11, it will be seen that air suction is communicated from the port valve member 11' to the forming dies at forming positions II and III and pressing position IV and air pressure is communicated from the port valve member 11 to the forming dies at discharge position V. Thus, as can be seen from FIGS. 9 and 11, the port valve member 11' has two separated vacuum sections, the first communicating with its port valve 17 and being supplied with relatively low vacuum by a pipe 25 through a suitable poppet valve (not shown) and the second communicating with its port valve 18 and being supplied with high vacuum by a pipe 27 supplied with relatively high vacuum. The opposite port valve member 11 also has two separate sections, the first communicating with its port valve 14 and being supplied with atmospheric air through pipe 29 and the second communicating with its port valve 16 and being supplied with air under pressure by a pipe 31. Although conical portions 19 and 19' do not contact the adjacent rotating members carrying ports 13 and 15, the location of the adjacent conical surfaces must be set close enough to prevent any appreciable loss of either vacuum or air as may be the case. This is necessary since it is only the adjacent conical surfaces 19' and the surface containing ports 15 that prevent leakage between the systems of low or high vacuum comprising ports 17 or 18 respectively and ports 15. The importance of this spacing of conical surfaces only a limited distance apart so as to seal against leakage while avoiding rubbing contact is further illustrated in connection with conical surface 19 having ports 14 and 16 connected to sources of atmospheric air and air under pressure respectively, and connection of these systems in turn to various ports 13 in the adjacent conical surface.

The cycle of operation of the above described structure will be apparent from FIGS. 18 through 25, wherein the even figures show the pressure end of the apparatus and the odd figures the vacuum end of the apparatus throughout a complete cycle, vacuum being shown as horizontal lines, pressure as vertical lines and atmospheric air as diagonal lines. Thus, immediately after the forming die has been moved from I to II and immersed in the mixture in the tank, suction or low vacuum is applied through port 17 by means of a suitable poppet valve controlled, for example, by the rotation of shaft 30. This causes an initial pulp deposit to form on the screen of the forming dies, but because of the low vacuum, the deposit will not be so tightly packed as to retard the deposit of more fiber. During movement of the die from II to III, the forming die port 15 is advanced to connect to port 18 through which high vacuum is applied, the port 15 bridging between the ports 17 and 18 during its movement so that vacuum is supplied to the forming die at all times during such movement. Continued movement of the forming die to position IV still retains the connection to vacuum through port 18, but also connects to port 14 so that atmospheric air may be admitted to more rapidly expel water lying in the die carrier structure. Preferably, such admission of air is controlled by a suitable valve (not shown) for adjustment of amount and duration of admitted air. The next step of the forming die brings it into communication with compressed air admitted through port 16, again preferably controlled by a suitable valve (not shown), to assist in the transfer of freshly formed articles from the forming die. Thereafter, all pressure and suction is cut off during washing and cleaning of the dies at station I. However, any washing water or other fluid which may pass through the dies during this washing operation can drain off by gravity from the bottom of the die carrier through pipe D of FIG. 20.

In order intermittently to advance the drum 10 from one station to the next, a stepping drive means is provided as best shown in FIGS. 1–3 which not only advances it from station to station, but also provides means for locking it in position at a station during the time in which an article is being transferred from a forming die to a transfer die. Such drive means includes mounted on shaft 5 for rotation therewith a stepping wheel 22 having in its periphery a plurality of indexing recesses 24 of generally semicircular shape to represent said stations, herein five in number. A pawl means, including a pawl roll 26 cooperates with said detents to advance the drum 10, such pawl roll being of cylindrical shape and mounted for free rotation to insure that said pawl roll seats into detents 24 by rolling rather than sliding and is retained therein by virtue of their slightly greater than semicircular depth. Suitable driven cam means are provided for operating the pawl roll 26. Also, to provide positive positioning of the forming drum in one of its positions, there is also preferably provided a lock means including a cylindrical back roll 28 cooperating with one of said detents 24.

There is provided rotatably mounted on frame 1 a cam drive shaft 30 driven by a gear 31 from a pinion 32 powered by any suitable means such as motor 33 through gearbox 35. On one end of said shaft for rotation therewith is mounted a cam plate 40 having a plurality of cam tracks therein for operating the pawl roll 26 and the lock roll 28 as desired.

More specifically, a pawl index plate 42 is mounted for swinging movement about the axis of detent wheel 22 and carries at its outer end beyond said wheel a link 44 extending in a direction contrary to that of the advance of drum 10 and carrying at its free end pawl roll 26. For swinging said pawl plate in a clockwise direction as shown in FIGS. 1 and 9 to advance said forming drum from one station to another, a connecting rod 46 is provided connected to a cam lever 48 pivotally mounted at its other end on frame 1 and having intermediate its length a follower 50 arranged to travel in a cam track 52 (hereinafter referred to as cam A) on cam plate 40, which cam serves both to advance the forming die carrier drum 10 by engagement of pawl tooth 26 with a detent 24, but also to reverse its direction of travel to move said pawl roll to a preceding detent while the forming die carrier drum remains in stationary position. To accomplish this latter result, there is provided means operated by a second cam (hereinafter referred to as cam B) effective to lift pawl roll 26 out of a detent 24 for reverse movement without moving drum 10, said means comprising a lever 60 pivotally mounted on pawl plate 42 and having at its free end an extensible link 62 so that said pawl roll 26 may be firmly seated during advancing movement in a detent 24. To swing the lever 60 is provided a connecting rod 64 connected at its one end to said lever 60 intermediate its ends and at its other end to cam follower lever 66 pivotally mounted on frame 1 and having a cam follower 68 arranged for travel in cam track 70 (cam B) on cam plate 40.

The locking means for positively positioning the forming drum at a station includes a bell crank 72 mounted on frame 1 adjacent detent wheel 22 and carrying at its one end freely rotatable cylindrical locking roll 28, the other end of said bell crank being connected through a connecting rod 74 to one end of a cam lever 76 pivotally mounted at its other end on frame 1 and having a cam follower 78 engaging a cam track 80 (hereinafter referred to as cam C) in cam plate 40.

With the above described arrangement, the forming drum 10 will be progressively advanced and positively maintained in stationary position at each station so that an article may be formed by suction while a die 8' is in stationary position at stations II and III and may be removed by air pressure, again with the die in stationary position, at discharge station V.

For transferring the formed articles from the forming dies while locked in stationary position at discharge station V, the present invention provides novel transfer means including a transfer die 9 adapted to cooperate with a forming die 8 to receive said articles and operating means therefor for first moving said transfer die 9 in a straight line vertically from cooperating position with said forming die 8 (FIGS. 13 and 14) and then swinging it, preferably through a vertical arc, from its input station to an output station remote therefrom adjacent a suitable conveyor.

More specifically, and as best shown in FIGS. 1 and 4–8, the transfer mechanism comprises a pair of elevator posts 82 vertically mounted on frame 1 in suitable bearings 84 for vertical sliding movement. Said posts are vertically reciprocated in timed relationship with the forming drum by means of a cam plate 86 mounted at one end of cam shaft 30, and a pair of cam levers 88 interconnected by a shaft 90 and having their one end connected to elevator posts 82 through links 92. One of said cam levers has a cam follower 94 for moving said levers and said posts in response to the rotation of cam plate 86, hereinafter referred to as cam D. Mounted on posts 82 are brackets or support plates 96 rotatably supporting therebetween a rocking shaft 98 having mounted thereon for swinging movement therewith a pair of arms 100 and rotatably supported therebetween is a transfer die housing 102 carrying transfer dies 9. In order to maintain transfer die housing 102 in a horizontal position throughout its entire travel, a pair of pivotally mounted hollow link members 104 and 104' are employed, these being pivotally secured at one end to support plates 96 and at their other end to transfer die housing 102. These link members 104, together with arms 100 form a parallelogram of motion throughout the movement of transfer die housing 102 from a position over the discharge station V to an output position remote therefrom.

The hollow link members 104 and 104' not only serve to maintain the transfer die housing 102 horizontal at all times, but they also provide a connection to the interior of said housing to provide air suction or pressure thereto as required. Thus, vertical tubes 106 and 106' are provided arranged with suitable valve means (not shown) to be connected to said hollow link members 104 and 104' respectively at support plates 96, said tubes being connected respectively as by flexible or telescoping tubes to sources of air suction and pressure (not shown) whereby when the housing 102 is in position over the forming drum discharge position V, it is in communication with air suction tube 106 only and so remains during its transfer, and when over its output position, is in communication with air pressure tube 106' only.

For rocking shaft 98 to move arms 100 with transfer die housing 102 through a vertical arc of travel, a gear segment 114 is provided thereon, said gear segment being driven by a pinion 116 on a vertical shaft 118 rotatably mounted on frame 1 and itself driven by camming means including a cam plate 120 mounted on common drive shaft 30. Cam plate 120 has therein a cam track 122 (hereinafter referred to as cam E) arranged to swing, through its cam follower 126, cam lever 124 mounted at one end on frame 1 and connected at its other end by a link 128 to a gear segment 130 mounted for rocking movement on frame 1 and driving lower pinion 132 on shaft 118. The shaft 118 moves vertically, whereas the gear 132 is stationary, being driven by the stationary gear segment 130. To provide for the vertical movement of shaft 118, there is provided a multiple key or spline arrangement on the shaft 118 cooperating with suitable grooves or keys in the gear 132, enabling the position of the shaft 118 to always register accurately with the position of gear 132 regardless of the vertical or up-and-down motion of the shaft 118 and the transfer mechanism.

Since the up-and-down movement as well as the rotary movement of the transfer mechanism above described must be accomplished rapidly, it is sometimes desirable to provide auxiliary means to aid the mechanical cam action in accelerating or decelerating the up-and-down motion of the entire transfer mechanism to control the movement of the transfer die at each end of its travel to avoid damage to the freshly formed articles yet achieving high speed transfer. At no time, however, does this aiding force change the timing or cycle operation of the transfer unit, but simply removes a part of the mechanical load or force required to accomplish these motions. Such force may be provided by a hydraulic rotary vane motor having a stationary exterior vane structure 108 with a movable interior vane structure 109 mounted on shaft 90, all as best shown in FIG. 1. Inlets 110 and 112 are provided between each pair of stationary vanes on each side of a movable vane positioned therebetween so that application of hydraulic pressure to one set of inlets 110, for instance, will move said shaft 90 in one direction through its travel and application of pressure to the other set of inlets 112 will move shaft 90 in the opposite direction through its travel. Suitable means, such as valve 115, actuated by shaft 30 may be used alternately to connect said inlets to a source of hydraulic pressure or to exhaust, and such exhaust may be through an orifice at the final portion of its travel to decelerate the transfer mechanism just before it comes to rest.

Additionally, for directly aiding the movement of the transfer arms 100, an air cylinder, generally designated 140, as best shown in FIGS. 5 and 8, is interposed between an elevator post 82 and transfer arm rocking shaft 98. Thus, such cylinder at its lower end is pivotally mounted on a pin 141, and its piston and rod assembly 142 is mounted for vertical movement on a support plate 96 by means of a link 143. The piston and rod assembly 142 is actuated by a boomerang-shaped cam 144 on rocking shaft 98 engaging a cam follower 145 on the piston rod so that the piston is moved downward as the transfer arms approach the end of their travel to compress air in cylinder 140. Preferably, for better control of the motion of the transfer arms, a one-way valve 146 is mounted generally centrally within cylinder 140 and a bypass 147 including an orifice is provided whereby downward movement of the piston closes valve 146 and forces air through bypass 147 to provide slow deceleration of the transfer arms at the end of their travel, and upward movement of said piston opens valve 146 so that air compressed in the chamber beneath said valve will aid in accelerating the movement of the transfer arms during the start of their travel. Also, to assist in supporting the weight of the transfer arms, the chamber beneath the valve 146 is supplied with air at a predetermined pressure by means of a reducing valve 148.

With the above described transfer mechanism, the transfer dies 9 are operated to pick up articles from the forming dies 8 and transfer them in horizontal position to a conveyor at an output station. Such conveyor may be continuously or intermittently operated in timed relation to the transfer dies and includes a plurality of smooth surfaced pans 150 swingably supported between a pair of chains 152 trained around sprockets 154 and driven by any suitable means, not shown.

According to the present invention, it is contemplated that a pressing operation may, if desired, be carried out at position IV of the machine of FIGS. 1–3 by novel means best shown in FIGS. 15 through 17. As shown in said figures, the pressing die element itself consists of a foraminous die body 160 having an expandable rubber covering 162 which fits closely about the body 160 in its normal unexpanded condition at which time it is of such a size as to fit into a forming die 8 substantially without contact with the freshly formed article retained therein. For expanding the rubber covering into contact with said article, fluid pressure from any suitable source (not shown) is applied by suitable timed valve means through pressing die body inlet pipe 164.

In order that the pressing dies themselves may be moved to and from their operative position in timed relation to the intermittent rotation of the forming drum, said dies are mounted on a supporting structure 166 mounted for radial sliding movement relative to the forming drum shaft 5 by means of a track 169 extending along links 168 pivotally mounted on said shaft. The movement of the pressing die supporting structure along track 169 is accomplished by camming means mounted on cam shaft 30, said camming means including a cam plate 170 having an outer cam track 171 cooperating with its cam follower 172 mounted on lever 180 to move said supporting member 166 through links 182 and supporting levers 184 pivotally mounted on the frame of the machine for supporting link 168 and moving said supporting member 166 along its track 169.

For locking the supporting structure 166 in its operative position with the pressing dies advanced into position within a forming die, locking levers 190 are provided mounted on the end of links 168, said locking lever having at its end a roller 191 engaging the end surface 167 of pressing die supporting structure 166 when in its operative position to so lock it. The operation of the locking lever is accomplished by an inner cam track 173 on cam plate 170 cooperating with a cam follower 174 mounted on lever 194 to move said locking lever 190 through links 196, bell crank lever 197 pivotally mounted on machine frame 1 and links 198 extending between said bell crank lever and said locking lever 190.

In order that the pressing operation accomplished by the above described mechanism may be most effective, it is usually desirable to wet or otherwise soften the exposed surface of the freshly formed article just prior to its being compressed by the pressing die. This may readily be accomplished by means of a fine water or other shower from nozzles 200, which may be timed to operate just before the pressing dies are advanced to operative position.

By means of a pressing operation accomplished by the above described mechanism, an improved structure of the finished article is achieved by uniform compaction thereof, as well as an improved surface appearance. This occurs because the fiber formation, that is, the interlacing or interlocking of fibers during the initial formation of the article is considerably more uniform and hence provides a stronger structure than do the fibers which are deposited during the latter stages of the forming operation. If the surface of an article having a rather loose outside formation is allowed to dry out materially, pressing does not effect as complete an interlocking of these fibers as is accomplished if there is a substantial amount of water present in the outer layer, which water is redistributed through the article and expelled therefrom by the pressing operation itself. This is particularly true where the character of the pulp material tends to a slow rate of deposit in which case to secure a reasonably short molding time, a liquid-fiber mixture having a high ratio of fiber to water may be utilized. However, at higher fiber concentrations, the article becomes increasingly loosely formed and neither strength nor appearance are as good as with lower ratios. However, by the addition of sufficient water or other liquid to the article just prior to the pressing operation, there is achieved a reorientation of fiber structure which greatly improves fiber interlocking and surface appearance of the finished product.

The general operation of the preferred apparatus of the invention having been earlier described, the following description of its operation will be limited to the sequence and timing of the various elements of the specific apparatus, particularly as controlled by the cams A—F mounted on cam shaft 30.

Assuming the mechanism of the machine of this invention is in the position shown in FIG. 1, the transfer mechanism and die is in a position to discharge an article from the die 9 to a dryer tray 150. A freshly molded article has been held on die 9 by vacuum or suction, this being applied through the tube 104, the transfer carrier 102, and the transfer die itself, 9. Immediately before the transfer die starts to rise, vacuum is shut off and compressed air is applied through tube 104′, the carrier 102 and the interior of transfer die 9 which dislodges the article therefrom and deposits it on the dryer tray 150.

The upward movement of the transfer die mechanism, which includes not only the dies but the carrier 102, shaft 96, gears 114–116, is accomplished by a lifting cam 86 (D) on the cam shaft 30, this lifting cam operating on roll 94 at lever 88, which lever is connected directly to one of the lifting rods, or posts 82, the lever at the same time being affixed to shaft 90, operates lever 88′, lifting or raising the other post 82, which insures that the transfer mechanism and its dies are lifted uniformly and by direct vertical motion.

As soon as the transfer mechanism has reached its uppermost position, cam 120 (E) acts on cam roll 126, cam lever 124, to rotate gear segment 130, this segment being meshed with gear 132 on shaft 118, also rotates the bevel gear 116, this, in turn, meshing with gear segment 114, rocks or rotates the transfer shaft 98, carrying with it the transfer die carrier 102 and the transfer dies 9.

As previously explained, the lever 100 and the hollow tube members 104 and 104′ form a parallelogram of motion, thereby insuring that the dies 9 stay in a horizontal position during their entire motion from the position over the dryer tray to a position indicated in the dotted lines of FIG. 5 or over a forming die or group of dies.

As soon as the transfer carrier 102 and transfer dies 9 reach the position indicated in the dotted lines of FIG. 4, cam 86 (D) acts to lower both of the posts 82 and the entire transfer mechanism, including the transfer dies, to bring these dies in contact with a previously formed and pressed article on the forming die or dies 8. As soon as contact has been established, vacuum or suction which previously existed in the forming die chamer and behind the dies at position V, is cut off and compressed air is introduced through one of the two conical valve members previously described, dislodging the article from the wire mesh of the forming die and transferring it to the transfer die to which vacuum has been applied to retain the article thereon. Immediately thereafter, cam 30 raises the entire transfer mechanism and transfer dies directly vertically, after which the swinging motion of the transfer mechanism is reversed from that previously described, and the transfer dies are again brought over a dryer tray to discharge a second article or group of articles thereon.

As soon as the transfer die has been raised sufficiently from the dotted position shown in FIG. 4 to clear the forming dies at position V, the stepping or rotating mechanism previously described and operated by cam 40, lever 48 and stepping pawl 26, acts to rotate or turn the forming unit to bring die 4 into the upper position previously indicated by die 5, and to immerse a new forming die or set of dies in the liquid pulp mixture for the formation of a subsequent article or group of articles.

Therefore, it will be seen that the rotation of the forming unit from position to position occurs while the article is being moved from a position above the forming die to the dryer tray, and the rotary motion of the forming unit to its new position is completed before the transfer die is moved back into the dotted line position indicated in FIG. 4.

At each of the rest or stationary positions of the forming unit, five simultaneous operations occur. First, the removal of a freshly formed article by transfer dies already described at position V. The cleaning of the wire mesh or other die coverings by high pressure water or other jets at position I. The initial formation of a portion of the article at position II. The completion of the formation of the article at position III and the pressing or solidification of the article at position IV.

The pressing dies which have already been described are moved in alignment with the forming dies by suitable guide members 169, and are moved to and from engagement with the forming dies by lever 184, which lever is operated by a cam 170, cam lever 171 and link 182. For securing the pressing die structure in pressing position, it is locked in this position by means of a lock roll 191 and lever 190, which is operated by a cam 173, cam lever 194, link 196, bell crank lever 197, and connecting link 197'.

With the pressing dies being locked in their inward position, or in a position where the flexible die surfaces are near the surface of the molded article on the forming die, pressure is introduced between the pressing die 160 and the flexible diaphragm 162, forcing it outwardly in all directions, firmly compressing and compacting the article over its entire surface regardless of the shape or configuration of the article itself.

As has been previously explained, it is sometimes desirable to add water to the surface of the freshly formed article just prior to this pressing operation in order that there may be sufficient water flow through the article itself to effect a complete interlocking of the fibers as they are being compacted.

Thus it will be seen that the invention provides a novel pulp molding machine having various novel aspects as hereinabove pointed out. Modifications of the invention within the spirit thereof and the scope of the appended claims will occur to those skilled in the pulp molding art.

I claim:

1. In a pulp molding machine a forming drum mounted for rotation about a horizontal axis and having a generally cylindrical central portion and generally conical end portions on said central portion, said central portion having a plurality of circumferentially arranged uniformly-spaced supports defining a plurality of forming drum positions for supporting a plurality of forming dies around the periphery thereof, and said end portions having port apertures communicating at each end with each of said positions, a port valve member mounted in fixed position adjacent each end of said forming drum, and having a conical portion of opposite form cooperating with the conical end portions of said forming drum, each of said port valve member conical portions having at least one port aperture therein successively communicating with said forming drum positions upon relative rotation of said drum and said member, and means for establishing the axial adjustment of said port valve member relatively to said forming drum to space said forming drum conical portion and port valve conical portion a limited distance out of contact with one another.

2. In a pulp molding machine as claimed in claim 1 further including sealing means interposed between said forming drum and each of said port valve members.

3. In a pulp molding machine having a frame, the combination of a horizontal shaft mounted at its ends in bearings for rotation relative to said frame, said bearings holding the shaft against endwise movement, a forming drum mounted on said shaft and fixed thereto against endwise movement and having a generally cylindrical central portion and generally conical concave end portions on said central portion, said central portion having a plurality of circumferentially arranged uniformly-spaced supports defining a plurality of forming drum positions for supporting a plurality of forming dies around the periphery thereof, and said end portions having port apertures communicating at each end with each of said positions, a port valve member mounted on said frame adjacent each end of said forming drum, and having a conical convex end portion cooperating with the conical end portions of said forming drum, said forming drum conical end portions fitting within said port valve conical portions with the mating conical surfaces of said conical portions parallel to and concentric with one another, each of said port valve member conical portions having at least one port aperture therein both successively communicating with one of said forming drum positions upon relative rotation of said drum and said member, adjustable means for establishing the axial adjustment of said port valve member relatively to said forming drum to space said forming drum conical portions and port valve conical portions a limited distance out of contact with one another including means for adjusting the axial positioning of each of said port valve members, and means for fixing the endwise location of said conical member relative to said bearing shaft and central portion.

4. In a pulp molding machine as claimed in claim 3 further wherein said means for adjustably establishing the spacing between said conical surfaces includes shim means interposed between each said port valve member and said frame.

5. In a pulp molding machine having a frame, the combination of a horizontal shaft mounted at its ends for rotation on said frame, said shaft having a generally central radially extending support means, a forming drum comprising a pair of generally cylindrical closely adjacent central members each having a plurality of circumferentially arranged uniformly-spaced supports defining a plurality of forming drum positions for supporting a plurality of forming dies around the periphery thereof, with conical end portions on the distal ends of said central members having port apertures communicating at each end with each of said positions, said central members being mounted on said support means in closely adjacent position with said end portions positioned outwardly therefrom, a port valve member mounted in fixed position adjacent each end of said forming drum, and having a conical portion of opposite form cooperating with the conical end portions of said forming drum, each of said port valve member conical portions having at least one port aperture therein successively communicating with said forming drum positions upon relative rotation of said drum and said member, and means for establishing the axial adjustment of said port valve member relatively to said forming drum to space said forming drum conical portion and port valve conical portion a limited distance out of contact with one another.

6. In a pulp molding machine as claimed in claim 5, wherein said support means comprises a radially extending disk welded to said shaft, said central members being removably attached to said disk in back-to-back relationship with their conical end portions outward.

7. In a pulp molding machine having a frame, a tank adapted to contain a dilute water-fiber mixture and a forming die carrier drum mounted on said frame for rotation about an axis above said tank to successively pass through said mixture a plurality of forming dies mounted in uniformly-spaced positions on said forming die carrier drum, the combination of forming drum drive means for intermittently moving said forming die carrier drum to advance said forming dies from a forming station in said mixture to a discharge station above the level of said mixture, mechanical transfer means for transferring articles formed on said forming dies from said forming dies at said discharge station, said transfer means including a transfer die adapted to receive said article from a forming die at said discharge station, and mechanical operating means timed with said forming drum drive means for said transfer means positively to move said transfer die in a straight line upward from cooperating position with said forming die while said forming die remains in stationary position and thereafter to swing said transfer die through an arc in a vertical plane to deposit articles at an output station remote from said discharge station, said operating means including a pair of transfer die supporting arms mounted for rotation about a horizontal axis and having gear means thereon, a pair of shafts mounted for rotation about a vertical axis said shafts having gear means thereon engaging said gear means on said arms for swinging said arms, and camming means including a cam and pivotally mounted cam follower means therefor, said cam follower means having gear means engaging said gear means on said shafts for rocking said shafts to swing said arms to move said transfer die through said arc.

8. In a pulp molding machine as claimed in claim 7 further including independent means interposed between said arms and said shafts for decelerating said arms at the ends of their travel, said means including air cylinder and piston means operated by camming means on said arms at the ends of its travel to compress air in said cylinder, said cylinder and piston means including a restricted orifice for restricting air flow during movement in a direction to compress air in said cylinder and valve means for free flow of air upon movement of said piston in the opposite direction.

9. In a pulp molding machine as claimed in claim 7 further including a transfer die housing pivotally mounted at the ends of said arms.

10. In a pulp molding machine as claimed in claim 9 further including link means pivotally mounted at its one end on said housing spaced from the pivot point of said housing and mounted at its other end spaced from said horizontal axis of rotation of said arms whereby said housing is maintained substantially parallel to a horizontal plane during movement of said arms throughout their travel.

11. In a pulp molding machine having a frame, a tank adapted to contain a dilute water-fiber mixture, a forming die carrier drum mounted for rotation about a horizontal axis above said tank to successively pass a plurality of forming dies mounted on said forming die carrier drum through said mixture, and forming drum drive means for intermittently moving said forming die carrier drum to advance said forming die carrier drum from one station to a succeeding station including a forming station in said mixture and a succeeding pressing station above the level of said mixture, the combination including expandible pressing die means mounted on a slide member adjacent said pressing station for bodily sliding movement radially of said drum into operative position within a forming die mounted on said drum and spaced from said forming die and an article carried thereby, track means on said frame supporting said pressing die slide member for bodily sliding movement radially of said drum, driving cam means for moving said pressing die means along said track means to and from said operative position in timed relation with the advance of said drum, locking cam means including lever means to contact said slide means in operative position to prevent rearward movement thereof, for locking said pressing die means in said operative position, and means for expanding said pressing die means while maintained in said locked position into contact with the surface of an article carried by said forming die to press said article.

12. In a pulp molding machine as claimed in claim 1, wherein said forming drum conical end portions are convex and said port valve conical portions are concave, said forming drum conical end portions fitting within said port valve conical portions with the mating conical surfaces of said conical portions parallel to and concentric with one another and spaced from one another.

13. In a pulp molding machine as claimed in claim 12 wherein said forming drum comprises a pair of closely adjacent central members each having end portions on their opposite ends, and support means are provided for supporting said forming drum, the closely adjacent ends of the said central members being mounted on said support means for central support thereof.

14. In a pulp forming machine, a rotatably mounted forming drum having an axially extending conical sealing surface at one end thereof, a stationary port box having a mating conical sealing surface, and means for establishing the axial adjustment of said port box relatively to said forming drum to space said forming drum conical sealing surface and said port box conical sealing surface a limited distance out of contact with one another.

15. In a pulp forming machine, a forming drum including a central shaft, said drum having an inside conical sealing surface at one end thereof, bearing means supporting said shaft and drum for rotation about a horizontal axis, a stationary port box surrounding said shaft, and means for establishing the axial adjustment of said port box relatively to said forming drum to space said forming drum conical sealing surface and said port box conical sealing surface a limited distance out of contact with one another.

16. In a pulp molding machine having a tank adapted to contain a dilute water-fiber mixture, a frame, a forming die carrier drum mounted for rotation in said frame about an axis above said tank successively to pass a plurality of forming dies mounted on said forming die carrier drum through said mixture, and forming drum drive means for intermittently moving said forming die carrier drum to advance said forming dies to a vertically positioned discharge station above the level of said mixture, the combination of transfer means for transferring articles on said forming dies at said discharge station, said transfer means including a transfer die and housing adapted to receive an article from a forming die at said discharge station and mechanical operating means for said transfer means to move said transfer die and housing in a straight line from cooperating position with said forming die while said forming die remains in stationary position and thereafter sequentially to swing said transfer die through an arc to deposit an article at an output station remote from said discharge station, said operating means comprising transfer die supporting arm means pivotally mounted at the inner end thereof for swinging movement and pivotally supporting at the outer end thereof said transfer die housing for rotation about a horizontal axis, shaft means parallel to said horizontal axis pivotally supporting said arm means at the inner end thereof for vertical swinging movement, bracket means carrying said shaft means and mounted for sliding movement on said frame, means for vertically moving said bracket means with said transfer die and housing and means for swinging said arm means to move said transfer die and housing through said arc, said means for vertically moving said bracket means being initially operable to complete a substantial portion of the straight line travel of said bracket means prior to operation of said means for swinging said arm means.

17. In a pulp molding machine having a tank adapted to contain a dilute water-fiber mixture, a frame, a forming die carrier drum mounted for rotation in said frame about an axis above said tank successively to pass a plurality of forming dies mounted on said forming die carrier drum through said mixture, and forming drum drive means for intermittently moving said forming die carrier drum to advance said forming dies to a vertically positioned discharge station above the level of said mixture, the combination of transfer means for transferring articles on said forming dies at said discharge station, said transfer means including a transfer die and housing adapted to receive an article from a forming die at said discharge station and mechanical operating means for said transfer means to move said transfer die and housing in a straight line from cooperating position with said forming die while said forming die remains in stationary position and thereafter sequentially to swing said transfer die through an arc to deposit an article at an output station remote from said discharge station, said operating means comprising transfer die supporting arm means pivotally mounted at the inner end thereof for swinging movement and pivotally supporting at the outer end thereof said transfer die housing for rotation about a horizontal axis, shaft means parallel to said horizontal axis pivotally supporting said arm means at the inner end thereof for swinging movement, bracket means carrying said shaft means and mounted for vertical sliding movement on said frame, means for vertically moving said bracket means with said transfer die and housing including first cam means having cam follower means effective vertically to move said bracket means and means for swinging said arm means effective to move said transfer die and housing through said arc including second cam means having cam follower means effective to rock said shaft means for swinging said arm means, said first cam means being initially operable to complete a substantial portion of the straight line travel of said bracket means prior to operation of said second cam means to swing said arm means.

18. In a pulp molding machine having a tank adapted to contain a dilute water-fiber mixture, a frame, a forming die carrier drum mounted for rotation in said frame about an axis about said tank successively to pass a plurality of forming dies mounted on said forming die carrier drum through said mixture, and forming drum drive means for intermittently moving said forming die carrier drum to advance said forming dies to a vertically positioned discharge station above the level of said mixture with a forming die positioned at said station facing vertically upward in horizontal position, the combination of transfer means for transferring articles on said forming dies at said discharge station, said transfer means including a transfer die and housing adapted to receive an article from a forming die at said discharge station and mechanical operating means for said transfer means to move said transfer die and housing in a straight line vertically upward from cooperating position with said forming die while said forming die remains in stationary position and thereafter sequentially to swing said transfer die through an arc in a vertical plane to deposit an article at an output station remote from said discharge station while maintaining said transfer die in generally horizontal position throughout said transfer, said operating means comprising transfer die supporting arm means pivotally mounted at the inner end thereof for swinging movement and pivotally supporting at the outer end thereof said transfer die housing for rotation about a horizontal axis, shaft means parallel to said horizontal axis pivotally supporting said arm means at the inner end thereof for swinging movement, bracket means carrying said shaft means and mounted for vertical sliding movement on said frame, link means pivotally mounted at its one end on said transfer housing spaced from said axis and mounted at its other end on said bracket means spaced from the axis of said shaft means, said link means together with said arm means providing a parallelogram of motion whereby said transfer housing is maintained generally horizontal throughout the travel of said arm means, means for vertically moving said bracket means with said transfer die and housing including first cam means having cam follower means effective vertically to move said bracket means and means for swinging said arm means effective to move said transfer die and housing through said arc including second cam means having cam follower means effective to rock said shaft means for swinging said arm means, said first cam means being initially operable to complete a substantial portion of the vertical travel of said bracket means prior to operation of said second cam means to swing said arm means.

References Cited in the file of this patent
UNITED STATES PATENTS

| Number | Name | Date |
|---|---|---|
| 747,632 | Parker | Dec. 22, 1903 |
| 771,292 | Zeyen | Oct. 4, 1904 |
| 1,118,030 | Lunt | Nov. 24, 1914 |
| 1,169,064 | Ayerst | Jan. 18, 1916 |
| 1,547,146 | Peiler | July 21, 1925 |
| 1,653,007 | Hall | Dec. 20, 1927 |
| 1,956,975 | Belcher | May 1, 1934 |
| 2,123,363 | Hoplin | July 12, 1938 |
| 2,234,979 | Randall et al. | Mar. 18, 1941 |
| 2,307,022 | Chaplin | Jan. 5, 1943 |
| 2,559,945 | Chaplin | July 10, 1951 |